United States Patent
Inamura et al.

(10) Patent No.: US 7,443,379 B2
(45) Date of Patent: Oct. 28, 2008

(54) INPUT DEVICE

(75) Inventors: Junichi Inamura, Fukushima-ken (JP); Isao Sato, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 583 days.

(21) Appl. No.: 10/909,932

(22) Filed: Aug. 2, 2004

(65) Prior Publication Data

US 2005/0030281 A1 Feb. 10, 2005

(30) Foreign Application Priority Data

Aug. 4, 2003 (JP) ............................. 2003-285672

(51) Int. Cl.
*G09G 5/00* (2006.01)
(52) U.S. Cl. ..................................... 345/156
(58) Field of Classification Search ............... 345/156
See application file for complete search history.

(56) References Cited

U.S. PATENT DOCUMENTS

| | | | |
|---|---|---|---|
| 5,815,139 A * | 9/1998 | Yoshikawa et al. | 345/157 |
| 5,912,612 A * | 6/1999 | DeVolpi | 338/95 |
| 6,977,644 B2 * | 12/2005 | Endo et al. | 345/157 |
| 2002/0050918 A1* | 5/2002 | Furudate et al. | 338/47 |
| 2002/0054015 A1* | 5/2002 | Wingett et al. | 345/156 |
| 2002/0054025 A1* | 5/2002 | Komata | 345/173 |
| 2002/0110237 A1* | 8/2002 | Krishnan | 379/419 |
| 2002/0171629 A1* | 11/2002 | Archibald et al. | 345/157 |
| 2003/0146900 A1* | 8/2003 | Endo et al. | 345/156 |
| 2004/0027231 A1* | 2/2004 | Inoue et al. | 338/47 |
| 2004/0145577 A1* | 7/2004 | Yajima et al. | 345/173 |
| 2005/0210303 A1* | 9/2005 | Ito | 713/320 |

FOREIGN PATENT DOCUMENTS

| | | |
|---|---|---|
| EP | 04283627 | 10/1992 |
| GB | 2 294 139 | 4/1996 |
| WO | WO 01/52037 | 7/2001 |
| WO | WO 03/010650 | 2/2003 |

OTHER PUBLICATIONS

Search Report dated Aug. 2, 2006, for corresponding European Patent Application No. 04 254 385.0.

* cited by examiner

*Primary Examiner*—Bipin Shalwala
*Assistant Examiner*—Afroza Y Chowdhury
(74) *Attorney, Agent, or Firm*—Brinks Hofer Gilson & Lione (57) ABSTRACT

An input device contains a resistance-element series formed by series-connected resistance elements, low resistors opposing the resistance elements, an operating object which brings one of the low resistors into contact with one of the resistance elements and changes the contact area therebetween, an output point at the midpoint between resistance elements, and a controller. When the resistance element and low resistor are not in contact, the input device enters a sleep mode in which the resistance-element series or low resistors have a high potential and the other a low potential. In the sleep mode, determination that the operating object has been operated occurs when a change in voltage or current on the low potential side is detected. A voltage is applied across ends of the resistance-element series, and the device enters a detection mode in which the output is based on the contact area change.

7 Claims, 7 Drawing Sheets

INPUT DEVICE

This application claims the benefit of priority to Japanese Patent Application No. 2003-285672, herein incorporated by reference.

BACKGROUND OF THE INVENTION

1. Field of the Invention

The present invention relates to input devices whose output is changed based on a change in pressing stroke or in pressure when pressing an operating object, and in particular, to an input device in which power consumption in a no-operation state is reduced.

2. Description of the Related Art

Input devices for game machines and personal computers include those whose output is changed in analog form based on a change in pressing stroke or pressure.

In the input device described in Japanese Unexamined Patent Application Publication No. 2002-93274, a so-called "click rubber member", such as a silicone rubber member, opposes an electrode provided on a base, and the click rubber member is supplied with pulse power. By operating a key top to allow the click rubber member to touch the electrode, electricity flows as an output. In addition, by pressing the click rubber member onto the electrode to elastically deform, the output is changed based on the amount of deformation.

In the above input device of the related art, when the click rubber member touches the electrode in response to the operation of the key top, the operation of the key top is recognized. Thus, the pulse power must be continuously supplied to the click rubber member even if the key top is not operated. In a state in which there is a distance between the click rubber member and the electrode, no power is consumed between the click rubber member and the electrode. However, continuous generation of pulse power as described above is wasteful power consumption.

By using plural electrodes and click rubber members of the above type, connecting the click rubber members in series, and extracting outputs from each midpoint between click rubber members, analog output which can be identified in positive and negative directions can be obtained. However, in this case, continuous supply of power to the click rubber members consumes power due to electrical resistance, so that wasteful power consumption occurs.

SUMMARY OF THE INVENTION

The present invention is intended to solve the above problems, and it is an object of the present invention to provide an input device in which no wasteful power consumption occurs when an operating object is not operated, and in which, as soon as the operating object is operated, the input device enters a detection mode.

According to an aspect of the present invention, an input device is provided which includes at least one resistance-element series formed by a plurality of resistance elements connected in series, low resistors respectively opposing the resistance elements, an operating object which brings one low resistor into contact with one resistance element and which changes the contact area therebetween, an output point provided at the midpoint between resistance elements of the resistance-element series, and a controller in which (a) when the resistance element and the low resistor are not in contact, the controller sets a sleep mode for setting one of the resistance-element series and each low resistor to have a high potential, and setting the other one to have a low potential, (b) in the sleep mode, the controller monitors the occurrence of a change in voltage or current on the low potential side, and, when a change is detected, the controller determines that the operating object has been operated, and (c) after the determination, the controller applies a voltage across ends of the resistance-element series, and sets a detection mode for obtaining, from the output point, an output based on a change in contact area between the resistance element and the low resistor.

Preferably, the number of resistance-element series is more than one, and the resistance-element series are connected in parallel.

Each of the resistance-element series may have two resistance elements. The number of resistance-element series is two and the two resistance-element series may be connected in parallel. The resistance elements may be disposed at intervals in two directions perpendicular to each other. The operating object may be used to move each of the low resistors which opposes each of the resistance elements.

In the sleep mode, the ends of the resistance-element series may be set to have high potentials, and each low resistor may be set to have a low potential, and by detecting a change in potential or current in the low resistors, the controller determines whether or not the operating object has been operated. In the detection mode, each low resistor may be set to have a high impedance.

In the sleep mode, the ends of the resistance-element series may be set to have low potentials, each low resistor may be set to have a high potential, and, by detecting a change in potential or current in the low resistors, the controller may determine that the operating object has been operated.

In the detection mode, when one low resistor and one resistance element are not in contact, a voltage obtained from the output point may be stored as a reference value.

The voltage obtained from the output point may be used to update the reference value at regular time intervals.

According to the present invention, by obtaining an output from the midpoint between resistance-element series formed by resistance elements connected in series, when the contact area between each resistance element and each low resistor with reference to the midpoint is changed, positive and negative analog outputs with the potential of the midpoint used as a reference can be obtained. In addition, by connecting resistance-element series of the above type in parallel, for example, positive and analog outputs in two different directions can be obtained.

In this case, in a sleep mode, the power consumption of the resistance elements can be reduced or nullified. Also, after it is detected that an object has been operated, a detection mode can immediately be set.

Moreover, by storing, a reference value, a voltage obtained from an output point between resistance elements, the zero points of positive and analog outputs can accurately be set.

DESCRIPTION OF THE PREFERRED EMBODIMENTS

Figure 1:
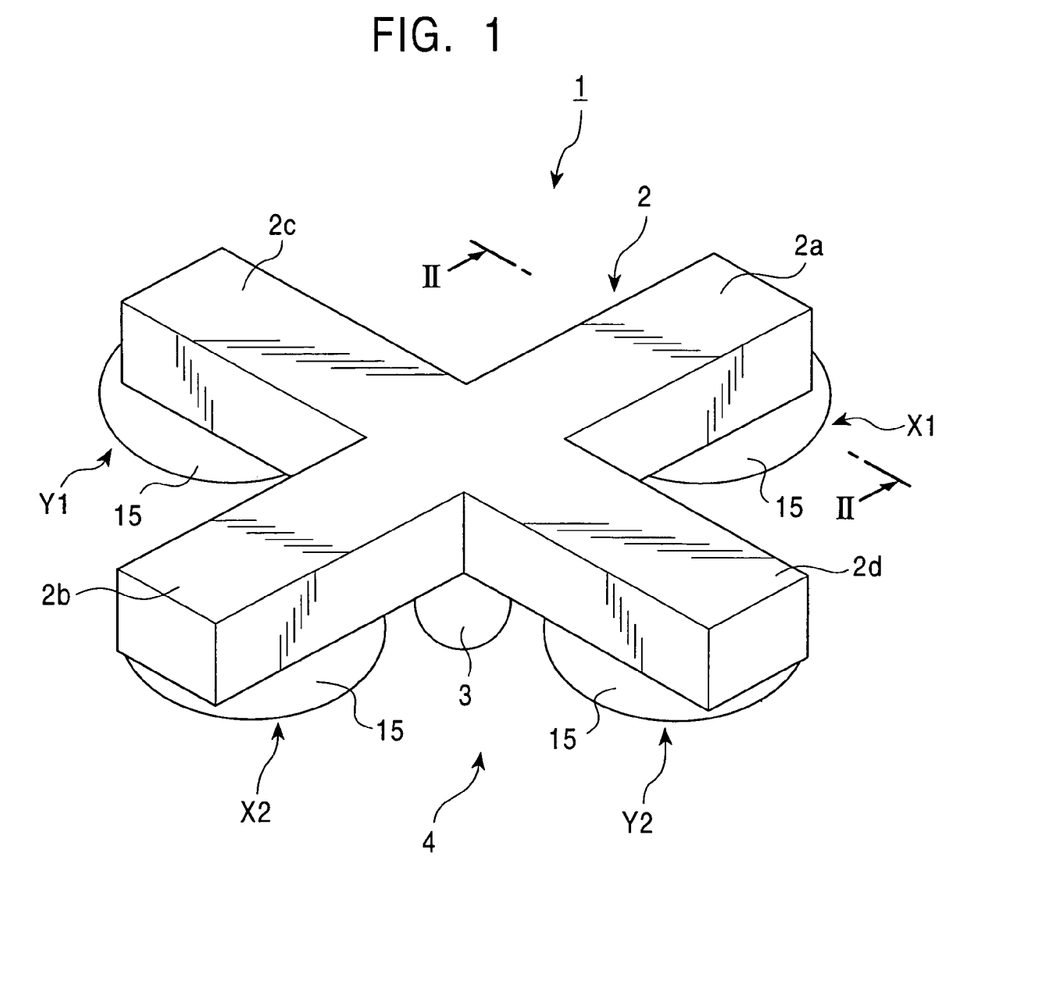
FIG. 1 is a perspective view showing a four-direction input device according to a first embodiment of the present invention.
Figure 2A:
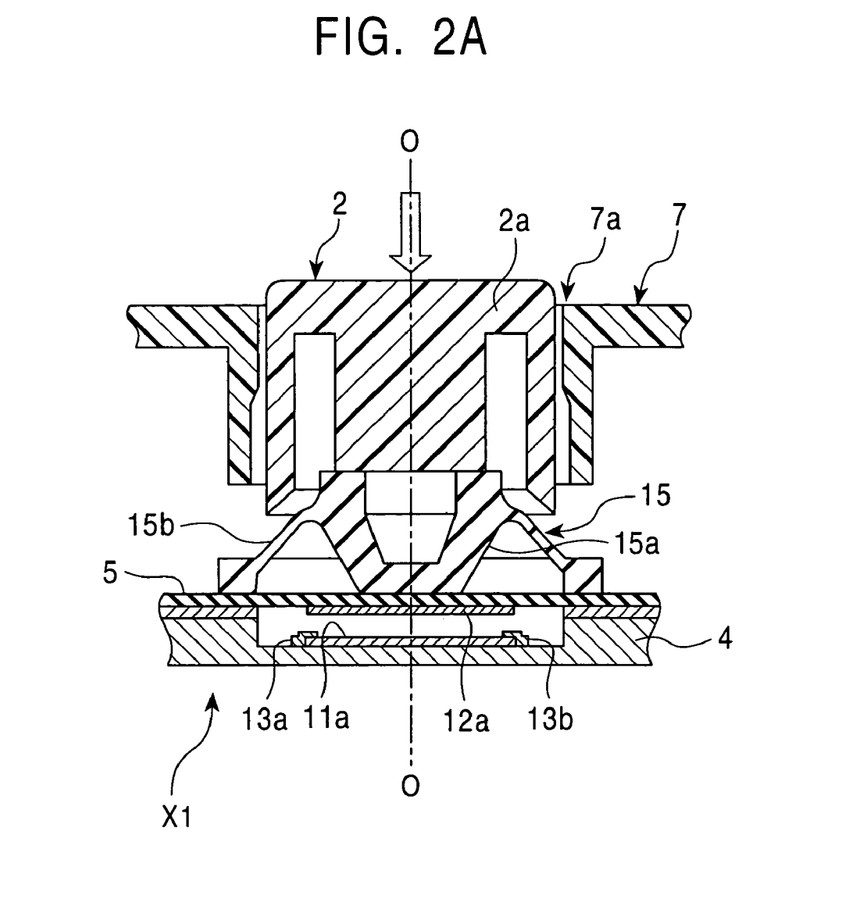
FIGS. 2A and 2B are sectional views showing the section along the line II-II in FIG. 1 by operation type.
Figure 2B:
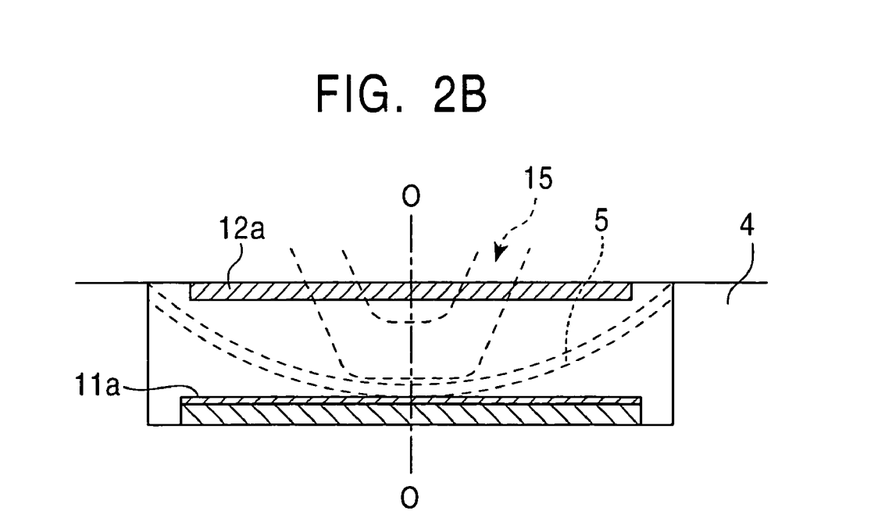
Figure 3:
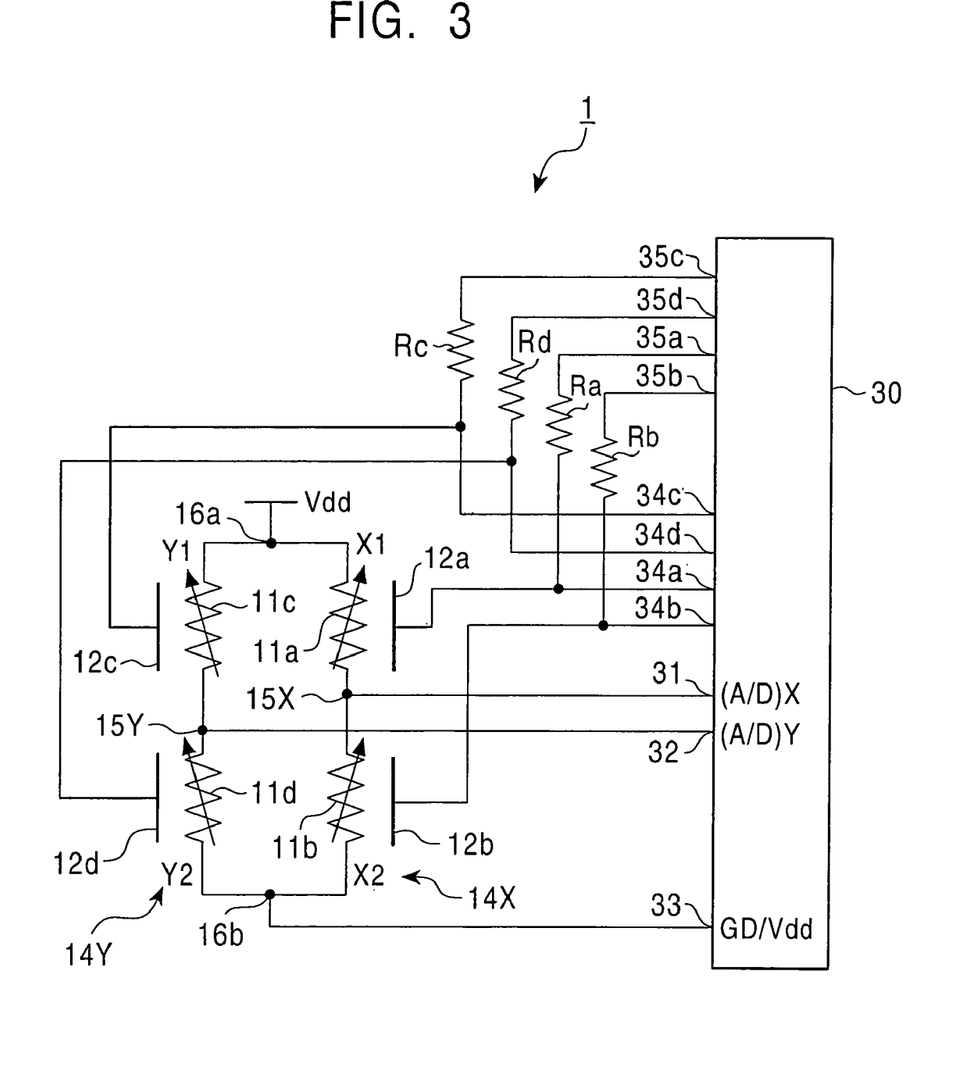
FIG. 3 is a circuit diagram showing a four-direction input device.
Figure 4:
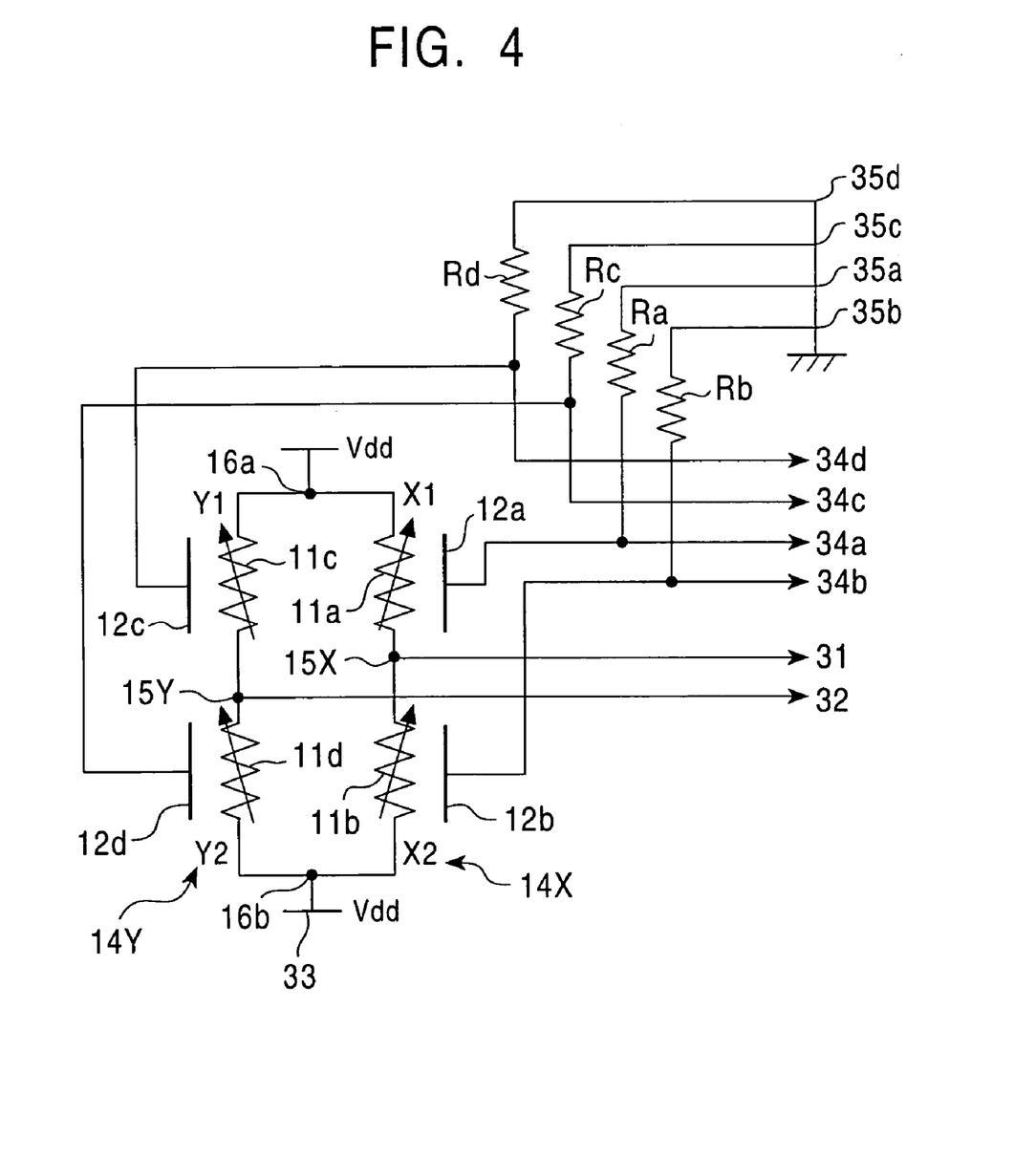
FIG. 4 is an equivalent circuit diagram illustrating a sleep mode.
Figure 5:
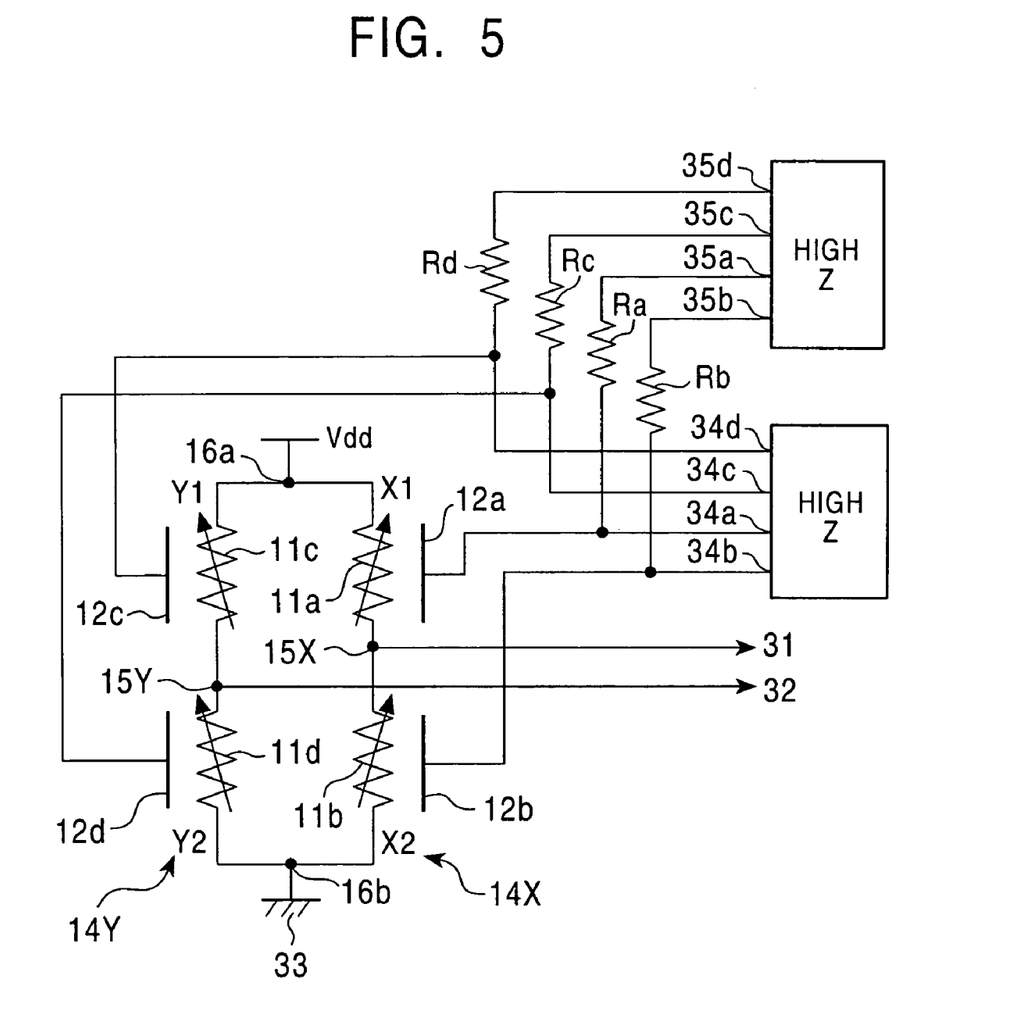
FIG. 5 is an equivalent circuit diagram illustrating a detection mode.
Figure 6:
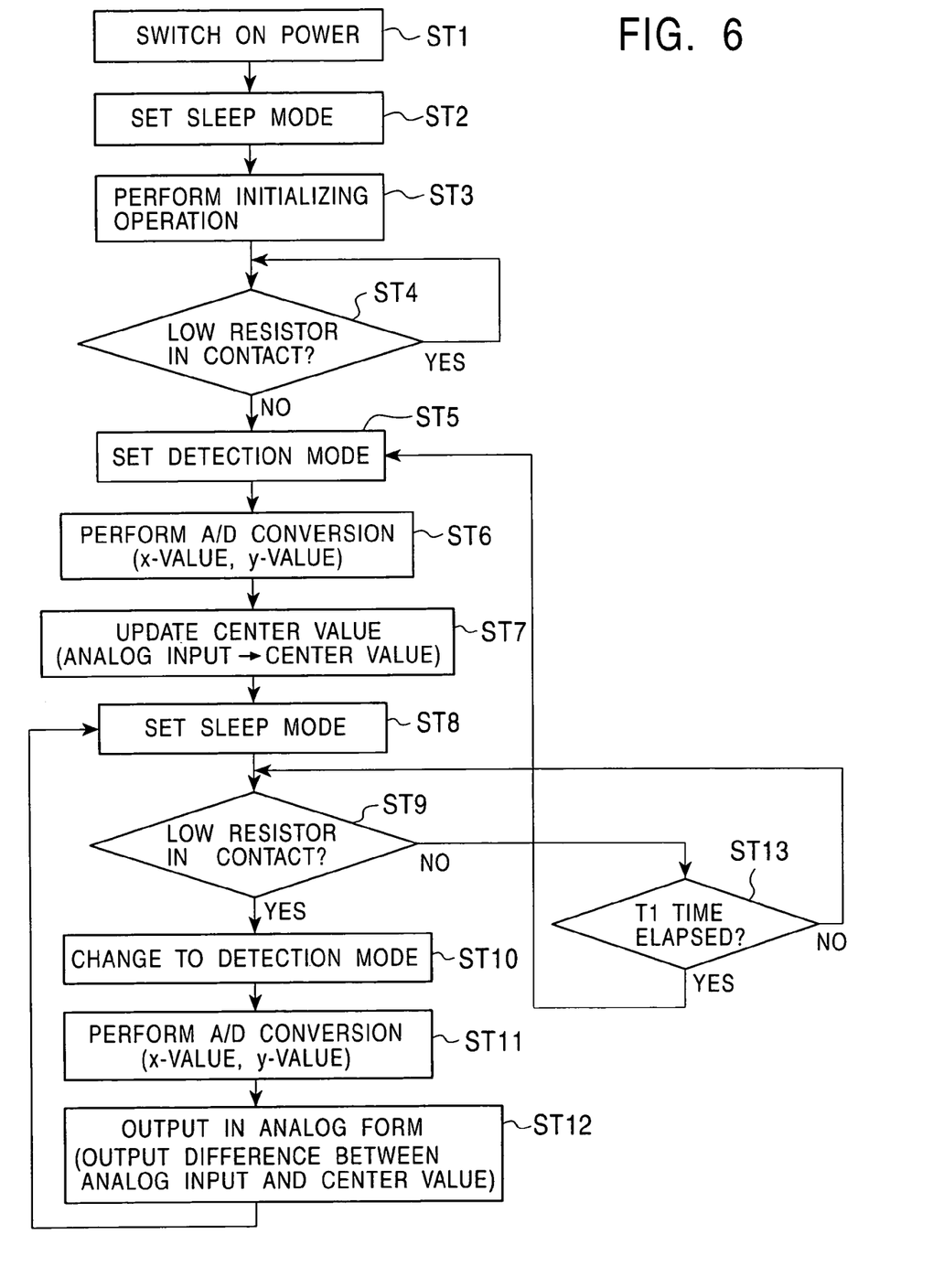
FIG. 6 is a flowchart of operation.

FIG. 1 is a perspective view showing the entire structure of a four-direction input device according to a first embodiment of the present invention. FIGS. 2A and 2B are sectional views taken on the line II-II shown in FIG. 1. FIG. 3 is a circuit diagram showing the four-direction input device. FIG. 4 is an equivalent circuit diagram illustrating a sleep mode. FIG. 5 is an equivalent circuit diagram illustrating a detection mode. FIG. 6 is an operation flowchart.

The four-direction input device 1 shown in FIG. 1 has four detecting sections X1, X2, Y1, and Y2, and an operating object 2 for operating the detecting sections X1, X2, Y1, and Y2. The detecting sections X1, X2, Y1, and Y2 are disposed at regular intervals in two directions perpendicular to each other. The detecting sections X1, X2, Y1, and Y2 are provided on a base 4.

The planar shape of the operating object 2 is a cross. Its arms extending in four directions have a first operating section 2a for operating the detecting section X1, a second operating section 2b for operating the detecting section X2, a third operating section 2c for operating the detecting section Y1, and a fourth operating section 2d for operating the detecting section Y2.

In the center of a bottom face of the operating object 2, a supporting projection 3 is formed in a form integrated with the bottom face. Accordingly, by using, as the fulcrum, the contact point between the supporting projection 3 and the base 4, the operating object 2 is capable of inclining movement in all the directions.

FIG. 2A is a sectional view showing the structure of the detecting section X1 and the first operating section 2a.

In the detecting section X1, a resistance element 11a fixed to the base 4 is provided. On the base 4, a flexible and insulating film 5 is disposed. A low resistor 12a is fixed to the film 5, and the low resistor 12a opposes the resistance element 11a, having space therebetween.

The resistance element 11a is a carbon film or the like, and its pattern is rectangular. Electrode films 13a and 13b are connected across the resistance element 11a. The low resistor 12a has an electrical resistance lower than that of the resistance element 11a, and is a film of metal such as silver, gold, or copper. The resistance element 11a and the low resistor 12a may be formed of any materials if both have a difference in resistance. The low resistor 12a is formed in, for example, a circular pattern.

In the detecting section X1, an elastic pressing member 15 is provided on an upper face of the film 5. The elastic pressing member 15 is formed of rubber material. The elastic pressing member 15 is formed such that a compressively deformable pressing part 15a and a thin compressively-deformable rib 15b for preventing the pressing part 15a from inclining are formed in integrated form.

The elastic pressing member 15 can be pressed by the first operating section 2a of the operating object 2. As shown in FIGS. 2A and 2B, a case 7 is disposed above the base 4, with a distance provided therebetween. In the case 7, a cross opening 7a is formed. The operating object 2 is positioned inside the opening 7a, and the upper face of the operating object 2 protrudes upward from the case 7. Accordingly, the operating sections 2a, 2b, 2c, and 2d of the operating object 2 can be pressed. In addition, although a locking mechanism for preventing the operating object 2 from coming out upward from the opening 7a is provided, it is not shown in FIGS. 1, 2A, and 2B.

By pressing the first operating section 2a of the operating object 2, the first operating section 2a presses the elastic pressing member 15. As shown in FIG. 2B, the film 5 is elastically deformed by the elastic pressing member 15, and the low resistor 12a touches the resistance element 11a. After the contact, by further pressing the first operating section 2a, the pressing part 15a of the elastic pressing member 15 is compressively deformed and the film 5 further warps, so that the contact area between the resistance element 11a and the low resistor 12a increases.

As a pressing stroke or pressure obtained when pressing the first operating section 2a becomes enhanced, the contact area between the resistance element 11a and the low resistor 12a increases. This increase in contact area reduces the electrical resistance between the electrode films 13a and 13b. In other words, as the pressing stroke or pressure when pressing the first operating section 2a becomes enhanced, the electrical resistance between the electrodes films 13a and 13b changes in analog form.

The structures of the detecting sections X2, Y1, and Y2 are each identical to that of the detecting section X1. In the circuit diagram shown in FIG. 3, a resistance element provided in the detecting section X2 is represented by 11b, and a low resistance element provided in the detecting section X is represented by 12b. A resistance element and low resistance element provided in the detecting section Y1 are represented by 11c and 12c, respectively, and a resistance element and low resistance element provided in the detecting section Y2 are represented by 11d and 12d, respectively.

The resistance element 11a in the detecting section X2 and the resistance element 11b in the detecting section X2 are connected in series to form a resistance-element series 14X, and the resistance element 11c in the detecting section Y1 and the resistance element 11d in the detecting section Y2 are connected in series to form a resistance-element series 14Y. The resistance-element series 14X and the resistance-element series 14Y are connected in parallel.

A controller 30 that controls the four-direction input device 1 is an integrated circuit including a central processing unit (CPU), a storage unit, an analog-to-digital (A/D) converting unit for supplying the CPU with a digital signal obtained by converting an analog input signal, a switch unit (switching port), and an input unit (input port).

In the resistance-element series 14X, the midpoint between the resistance element 11a and the resistance element 11b is an X-output point 15X. In the resistance-element series 14Y, the midpoint between the resistance element 11c and the resistance element 11d is a Y-output point 15Y. A voltage obtained at the X-output point 15X is supplied to an X-input A/D converting unit 31. A voltage obtained at the Y-output point 15Y is supplied to a Y-input A/D converting unit 32.

A parallel connection point 16a connected in parallel to one of the resistance-element series 14X and the resistance-element series 14Y is supplied with a power-supply voltage Vdd. In addition, a parallel connection point 16b connected in parallel to the other one of the resistance-element series 14X and the resistance-element series 14Y is connected to a switching unit 33 in the controller 30. The switching unit 33 is switched to have ground potential or the power-supply voltage Vdd.

The low resistor 12a in the detecting section X1 is connected to an input unit 34a of the controller 30, and the low resistor 12b in the detecting section X2 is connected to an input unit 34b. Similarly, the low resistor 12c is connected to an input unit 34c, and the low resistor 12d in the detecting section Y2 is connected to an input unit 34d. Each of the input units 34a, 34b, 34c, and 34d has an input-unit function of detecting the state of high potential or low potential. The input units 34a, 34b, 34c, and 34d can be set to have high impedances.

The low resistor 12a in the detecting section X1 is connected to a switching unit 35a in the controller 30 by an external resistor Ra. The low resistor 12b is connected to a switching unit 35b by a resistor Rb. The low resistor 12c is connected to a switching unit 35c by a resistor Rc. The low resistor 12d is connected to a switching unit 35d by a resistor Rd. Each of the switching units 35a, 35b, 35c, and 35d is switched to have the ground potential or a high impedance.

Next, the operation of the four-direction input device 1 is described below.

FIG. 4 illustrates a state in which the sleep mode is set by the controller 30. In the sleep mode, the switching unit 33 is set to have a power-supply voltage Vdd, and both the parallel connection points 16a and 16b are set to have the same power-supply voltage Vdd (high potential). The switching units 35a, 35b, 35c, and 35d are switched to have the ground potential. Ends of the resistors Ra, Rb, Rc, and Rd which are reverse to ends connected to the resistors 12a, 12b, 12c, and 12d are set to have the ground potential. The CPU in the controller 30 enters a mode that monitors the potentials of the input units 34a, 34b, 34c, and 34d.

In a state in which the operating object 2 is not operated, in the detecting section X1, the resistance element 11a and the low resistor 12a are not in contact, and also in the detecting sections X2, Y1, and Y2, the resistance elements 11b, 11c, and 11d are not in contact with the low resistors 12b, 12c, and 12d, respectively. Thus, the input units 34a, 34b, 34c, and 34d still have low potentials. Therefore, the CPU recognizes that the operating object 2 is not operated.

In the sleep mode, ends of the resistance-element series 14X and the resistance-element series 14Y are set to have the same power-supply voltage Vdd. Thus, no currents flow in all the resistors 11a, 11b, 11c, and 11d, so that power consumption can be saved. In case that the parallel connection points 16a and 16b have a potential difference therebetween, the difference is small. Accordingly, by increasing the resistances of the resistance elements 11a, 11b, 11c, and 11d, almost no currents flow in these resistance elements.

In the sleep mode described with reference to FIG. 4, when an operation on the operating object 2 causes the contact between the resistance element and the low resistor in one of the detecting sections X1, X2, Y1, and Y2, the low resistor in contact has a high potential, and, due to a voltage drop between this low resistor and a resistor (one of Ra, Rb, Rc, and Rd) connected thereto, one input unit in contact with the low resistor in one of the input units 34a, 34b, 34c, and 34d has high potential. By recognizing that one of the input units 34a, 34b, 34c, and 34d has a high potential, the CPU recognizes that the operating object 2 has been operated.

After the CPU recognizes that the operating object 2 has been operated, a detection mode is set in the controller 30.

As FIG. 5 shows, in the detection mode, the switching unit 33 is set to have the ground potential, and a potential difference (power-supply voltage Vdd) is given between the parallel connection points 16a and 16b. In other words, both ends of the resistance-element series 14X and 14Y are supplied with potential difference (power-supply voltage Vdd). In addition, the input units 34a, 34b, 34c, and 34d and the switching units 35a, 35b, 35c, and 35d are set to have high impedances.

In the detection mode, when the resistance element and the low resistor are not in contact in any detecting section, intermediate potential outputs are supplied to the X-input A/D converting unit 31 and the Y-input A/D converting unit 32. When the resistances of the resistance elements 11a, 11b, 11c, and 11d are equal, the intermediate potential is Vdd/2.

For example, when, in the detecting section X1, the low resistor 12a touches the resistance element 11a to change the contact area, and the resistance in the detecting section X1 decreases, the voltage supplied to the X-input A/D converting unit 31 increases to higher than the intermediate potential. This voltage is changed in analog form by changing a pressing stroke or the pressure obtained when pressing the first operating section 2a. Conversely, when, in the detecting section X2, the low resistor 12b touches the resistance element 11b to change the contact area, and the resistance in the detecting section X2 decreases, the voltage supplied to the X-input A/D converting unit 31 decreases to lower than the intermediate potential.

As described above, the voltage supplied to the X-input A/D converting unit 31 is changed in analog form in a positive direction when the first operating section 2a is pressed, and is changed in analog form in a negative direction when the second operating section 2b is pressed. The voltage supplied to the Y-input A/D converting unit 32 is changed in analog form in a positive direction when the third operating section 2c is pressed, and is changed in analog form in a negative direction when the fourth operating section 2d is pressed.

As described above, by changing pressures on the first operating section 2a, the second operating section 2b, the third operating section 2c, and the fourth operating section 2d, analog X-direction inputting and analog Y-direction inputting can be performed. In addition, combining pressing operations of the operating sections 2a to 2d enables analog multi-directional input represented by $\sqrt{(X^2+Y^2)}$.

In addition, in the detection mode in FIG. 5, the input points 34a, 34b, 34c, and 34d, and the switching units 35a, 35b, 35c, and 35d have high impedances. Thus, even if the low resistor and the resistance element are in contact in any detecting section, no currents flow into the input points 34a, 34b, 34c, and 34d, and the switching units 35a, 35b, 35c, and 35d.

Next, a consecutive process of the four-direction input device 1 is described below with reference to the flowchart shown in FIG. 6. In FIG. 6, each step is indicated by "ST".

By switching on the power of an apparatus using the four-direction input device 1 (step ST1), the sleep mode shown in FIG. 4 is set (step ST2), and the four-direction input device 1 enters an initializing operation (step ST3).

This initializing operation is performed after recognizing that, in each of the detecting sections X1, X2, Y1, and Y2, the low resistor is not in contact with the resistance element, that is, any of the input units 34a, 34b, 34c, and 34d has a low potential (step ST4). In the initializing operation, the detection mode shown in FIG. 5 is set (step ST5), and the voltage of the X-output point 15x is captured by the X-input A/D converting unit 31. This voltage is stored as an X-direction-output center value (X-direction reference value) in the controller 30. Similarly, the voltage of the Y-output point 15Y is captured by the Y-input A/D converting unit 32, and this voltage is stored as a Y-direction-output center value (Y-direction reference value) in the controller 30 (steps ST6 and ST7).

The X-direction-output center value means the mid-value of divisors (e.g., "128", "256", etc.) of a digital value which is converted by the X-input A/D converting unit 31. In other words, when, in any of the detecting sections X1, X2, Y1, and Y2, the low resistor is not in contact with the resistance element, the voltage of the X-output point 15X is stored as the center value of the divisors in the storage unit, and the voltage of the Y-output point 15Y is stored as the center value of the divisors in the storage unit (step ST7).

After the center value in the X-direction and the center value in the Y-direction are updated in the initializing operation, in step ST8, the sleep mode shown in FIG. 4 is set. In step ST9, in the sleep mode, any of the detecting sections X1, X2, Y1, and Y2 is monitored about whether the low resistor is in contact with the resistance element. When, in any of these detecting sections X1, X2, Y1, and Y2, the contact between the low resistor and the resistance element causes one of the input units 34a, 34b, 34c, and 34d to have a high potential, the four-direction input device 1 enters the detection mode shown in FIG. 5 (step ST10).

When, in the detection mode in step ST10, an operation on the operating object 2 changes the potentials of the X-output point 15X and the Y-output point 15Y, the voltages are converted into digital form by the X-input A/D converting unit 31 and the Y-input A/D converting unit 32 (step ST11). The CPU in the controller 30 calculates a difference between the digital converted value of X-input and the center value in the Y-direction, and recognizes the difference as an X-direction analog coordinate input value. Similarly, the CPU calculates a difference between the digital converted value of Y-input and the center value in the Y-direction, and recognizes the difference as an Y-direction analog coordinate input value (step ST12).

After the sleep mode is set in step ST8, it is determined in step ST9 that a state in which, in any of the detecting sections X1, X2, Y1, and Y2, the low resistor is not in contact with the resistance element has continued for a predetermined time (T1) (step ST13), the process returns to ST5, and the X-direction center value and the Y-direction center value are updated by the outputs of the X-output point 15X and the Y-output point 15Y. The four-direction input device 1 enters the sleep mode shown in step ST8.

In this embodiment, by setting the sleep mode when the operating object 2 is not operated, power consumption can be reduced. If the state in which the operating object 2 is not operated has continued for the T1 time, the sleep mode is changed into the initializing mode, and the X-direction center value and the Y-direction center value are updated. Therefore, even if the resistances of the resistance elements 11a, 11b, 11c, and 11d are not exactly equal, and these resistance vary due to a change in temperature, or the like, the center value of the divisors in digital of the X-direction input and the Y-direction input is constantly updated before changing into the detection operation, thus realizing accurate X-Y coordinate input.

Figure 7:
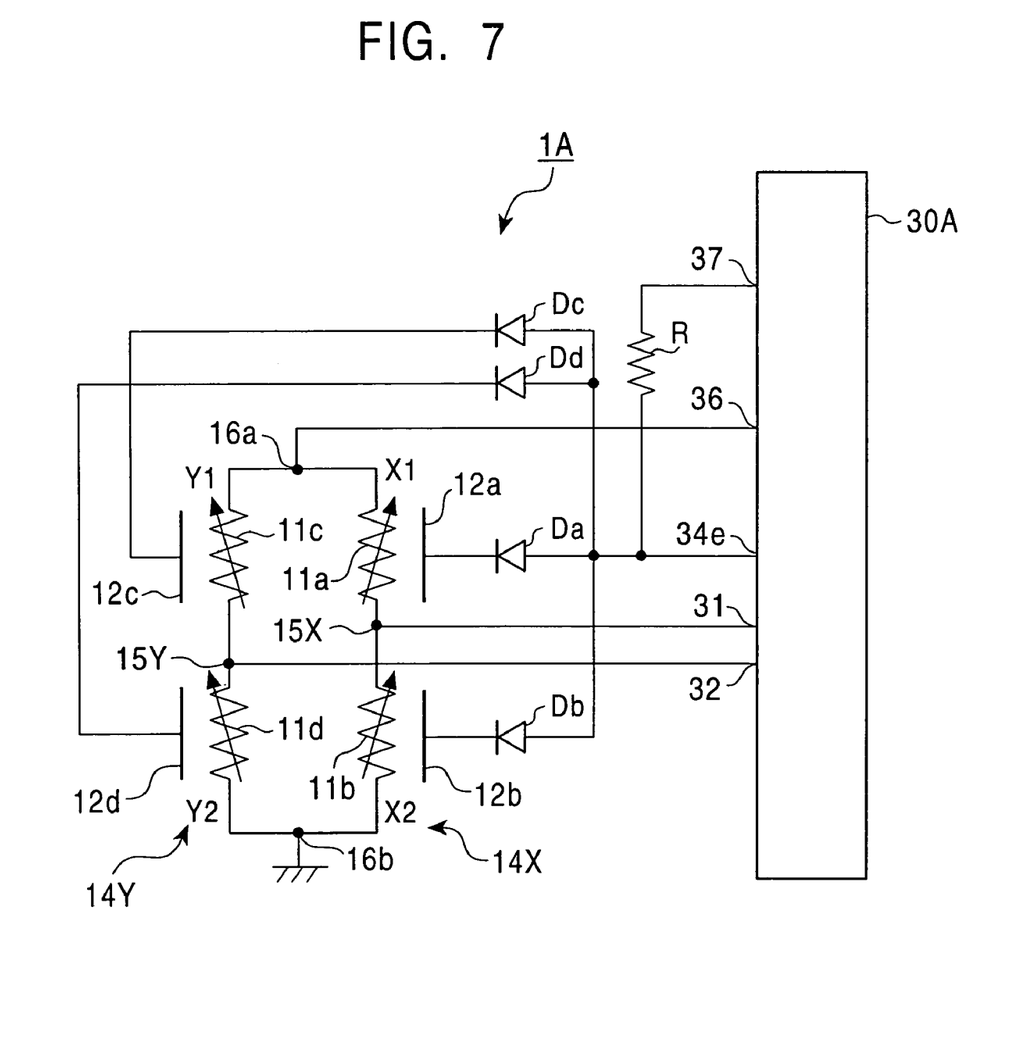
FIG. 7 is a circuit diagram showing a four-direction input device according to a second embodiment of the present invention.

FIG. 7 is a circuit diagram showing a four-direction input device according to a second embodiment of the present invention. In the second embodiment, by using identical reference numerals to denote portions identical to those in the first embodiment, a detailed description of the portions is omitted.

In the four-direction input device 1A shown in FIG. 7, low resistors 12a, 12b, 12c, and 12d in detecting sections X1, X2, Y1, and Y2 are connected to a single input unit 34e in a controller 30A. A resistor R is provided and the low resistors 12a, 12b, 12c, and 12d are connected to a switching unit 37 by the resistor R. The switching unit 37 is switched to have a power-supply voltage Vdd or a high impedance. The switching unit 37 may be such that it is continuously supplied with the power-supply voltage Vdd.

Between each of the low resistors 12a, 12b, 12c, and 12d and the resistor R, each of diodes Da, Db, Dc, and Dd is provided. These diodes each have, as a forward direction, a direction to the low resistors 12a, 12b, 12c, and 12d.

A point 16a connected in parallel to an X-side resistor-element series 14X and a Y-side resistance-element series 14Y is connected to a switching unit 36. The switching unit 36 is switched to have the power-supply voltage Vdd or the ground potential. The other parallel connection point 16b has the ground potential.

In the four-direction input device 1A, in a sleep mode, the switching unit 36 has the ground potential, and the power-supply voltage Vdd is applied to the switching unit 37. Thus, the low resistors 12a, 12b, 12c, and 12d each have a high potential, and the X-side resistor-element series 14X and the Y-side resistance-element series 14Y have low potentials (the ground potential).

When, in the sleep mode, in any of the detecting sections X1, X2, Y1, and Y2, the low resistor and the resistance element are not in contact, no current flows in the resistor R. Thus, an input to the input unit 34e is a low voltage. Hence, the power is not consumed in the sleep mode.

When, in the sleep mode, one of the detecting sections X1, X2, Y1, and Y2, the low resistor and the resistance element are in contact, a current flows in the resistor R, and a voltage drop in the resistor R causes the input unit 34e to have a high potential. This enables the controller 30A to recognize that the operating object 2 has been operated.

After the detection mode is set after recognizing that the operating object 2 has been operated, the power-supply voltage Vdd is applied to the switching unit 36. The switching unit 37 is switched to have a high impedance. However, the switching unit 37 may be set to have a power-supply voltage. When, in the detection mode, the low resistor 12a, 12b, 12c, or 12d touches one of the resistance elements 11a, 11b, 11c, and 11d to change the resistance, the voltage of at least one of the X-output point 15X and the Y-output point 15Y changes.

Since diodes Da, Db, Dc, and Dd are respectively connected to the low resistors 12a, 12b, 12c, and 12d, for example, when the resistance element 11a touches the low resistor 12a, a current can be prevented from flowing from the parallel connection point 16a in high voltage to the resistance element 11a, and to the low resistor 12a. Therefore, when, at plural positions of the detecting sections X1, X2, Y1, and Y2, resistance elements touch low resistors, a current can be prevented from flowing from one low resistor to the other low resistor.

The present invention is not limited to the foregoing embodiments, but may have a form in which only one resistance-element series is provided, and a form in which a resistance-element series includes three or more resistance elements and a voltage is output from the midpoint of adjacent resistance elements.

What is claimed is:

1. An input device comprising:
at least one resistance-element series, formed by a plurality of resistance element groups connected in series;
each resistance element group formed as a fixed resistive element and a corresponding deformable resistive element, the deformable resistive element oriented to face the fixed resistance element;
an operating object which brings a respective deformable resistance element into contact with the corresponding fixed resistance element and which changes the contact area therebetween;
an output point provided at a midpoint between two resistance element groups; and a controller in which:

(a) for respective resistance element groups, when the fixed resistance element and the corresponding deformable resistance element are not in contact, said controller enters a sleep mode and sets one of the fixed resistive element and deformable resistive element to have a high potential, and sets the other of the fixed resistive element and deformable resistive element to have a low potential;

(b) in the sleep mode, said controller monitors the occurrence of a change in voltage or current on a low potential side, and, when a change is detected, said controller determines that the operating object has been operated;

(c) after the determination of the change, said controller applies a voltage across the ends of the resistance-element series, and sets a detection mode for obtaining, from the output point, an output based on a change in contact area between the respective fixed resistive element and deformable resistive element a switching unit for switching a power-supply voltage that, in the sleep mode, sets the ends of the at least one resistance-element series to have the same power-supply voltage and that, in detection mode, causes the ends of the at least one resistance-element series to have a potential difference; and at least one input unit provided on the deformable resistance element side of each the plurality of resistance element groups that, by detecting a change in potential applied to the input unit, monitors whether a change in voltage or current occurs on the deformable resistance element side of each of the resistance element groups.

2. The input device according to claim 1, wherein the number of resistance-element series is more than one, and the resistance-element series are connected in parallel.

3. The input device according to claim 2, wherein:

each resistance element group comprises two resistance elements;

the number of resistance-element series is two and the two resistance-element series are connected in parallel;

the resistance element groups are disposed at intervals in two directions perpendicular to each other; and the operating object is used to move each respective deformable resistive element which faces the corresponding fixed resistive element.

4. The input device according to claim 1, wherein:

in the sleep mode, the ends of the resistance-element series are set to have high potentials, and each respective deformable resistive element is set to have a low potential, and by detecting a change in potential or current in the respective resistive element group, said controller determines whether or not the operating object has been operated; and in the detection mode, each respective deformable resistive element is set to have a high impedance.

5. The input device according to claim 1, wherein:

in the sleep mode, the ends of the resistance-element series are set to have low potentials, each respective deformable resistive element is set to have a high potential, and, by detecting a change in potential or current in the respective resistive element group, said controller determines that the operating object has been operated.

6. The input device according to claim 1, wherein, in the detection mode, when one respective fixed resistive element and corresponding deformable resistive element are not in contact, a voltage obtained from the output point is stored as a reference value.

7. The input device according to claim 6, wherein the voltage obtained from the output point is used to update the reference value at regular time intervals.

* * * * *